United States Patent
Provitola

(10) Patent No.: US 7,612,795 B2
(45) Date of Patent: Nov. 3, 2009

(54) ENHANCEMENT OF VISUAL PERCEPTION III

(76) Inventor: Anthony Italo Provitola, P.O. Box 2855, DeLand, FL (US) 32721-2855

(*) Notice: Subject to any disclaimer, the term of this patent is extended or adjusted under 35 U.S.C. 154(b) by 50 days.

(21) Appl. No.: 11/735,459

(22) Filed: Apr. 14, 2007

(65) Prior Publication Data

US 2008/0252718 A1  Oct. 16, 2008

Related U.S. Application Data

(60) Provisional application No. 60/799,817, filed on May 12, 2006.

(51) Int. Cl.
*H04N 13/00* (2006.01)
*G01C 3/00* (2006.01)

(52) U.S. Cl. .............................. 348/42; 396/138
(58) Field of Classification Search .................. 348/42, 348/51; 345/420, 589; 353/10; 382/154; 396/138
See application file for complete search history.

(56) References Cited

U.S. PATENT DOCUMENTS

| | | | |
|---|---|---|---|
| 2,679,188 A | 5/1954 | Gould | |
| 2,943,964 A | 7/1960 | Goldenberg | |
| 3,582,961 A | 6/1971 | Shindo | |
| 3,701,581 A | 10/1972 | Henkes | |
| 4,517,558 A | 5/1985 | Davids | |
| 4,633,322 A | 12/1986 | Fourny | |
| 4,819,085 A | 4/1989 | Liang | |
| 5,172,266 A | 12/1992 | Garcia et al. | |
| 5,257,130 A | 10/1993 | Monroe | |
| 5,291,330 A | 3/1994 | Daniels | |
| 5,488,510 A | 1/1996 | LeMay | |
| 5,510,832 A | 4/1996 | Garcia | |
| 5,541,642 A | 7/1996 | Ashbey | |
| 5,556,184 A | 9/1996 | Nader-Esfahani | |
| 5,751,927 A | 5/1998 | Wason | |
| 5,806,218 A | 9/1998 | Shanks et al. | |
| 5,886,771 A | 3/1999 | Osgood | |
| 6,157,733 A * | 12/2000 | Swain | 382/154 |
| 6,414,681 B1 | 7/2002 | Ohshima et al. | |
| 6,530,662 B1 | 3/2003 | Haseltine et al. | |
| 6,536,146 B2 | 3/2003 | Ericson | |
| 6,742,892 B2 | 6/2004 | Liberman | |
| 6,792,205 B2 * | 9/2004 | Frisken et al. | 396/138 |
| 6,862,024 B2 * | 3/2005 | Perry et al. | 345/420 |
| 6,929,369 B2 | 8/2005 | Jones | |
| 7,073,908 B1 * | 7/2006 | Provitola | 353/10 |
| 7,086,735 B1 | 8/2006 | Provitola | |
| 2003/0206179 A1 * | 11/2003 | Deering | 345/589 |
| 2005/0052617 A1 | 3/2005 | Fujikawa et al. | |
| 2005/0206582 A1 | 9/2005 | Bell et al. | |

\* cited by examiner

*Primary Examiner*—Gims S Philippe

(57) ABSTRACT

A system, device within a system, and a method for enhancing visual perception in a two-dimensional image is disclosed, providing the induction of retinal disparity in the viewer by in a system with which the two-dimensional image is viewed. With fusion of the retinally disparate images of the two-dimensional image, the viewer experiences the enhancement of his or her visual perception in the two dimensional image, which includes enhancement of depth perception and enhancement in clarity perception.

20 Claims, 3 Drawing Sheets

ENHANCEMENT OF VISUAL PERCEPTION III

The present application claims the benefit of and priority from U.S. Provisional Application No. 60/799,817 entitled ENHANCEMENT OF VISUAL PERCEPTION III filed on May 12, 2006.

CROSS-REFERENCE TO RELATED APPLICATIONS

U.S. application Ser. No. 11/033,186 for United States patent entitled ENHANCEMENT OF DEPTH PERCEPTION filed on Jan. 11, 2005; U.S. application Ser. No. 11/222,733 for United States patent entitled ENHANCEMENT OF VISUAL PERCEPTION filed on Sep. 10, 2005; Patent Cooperation Treaty Application No. PCT/US2005/047577 with International filing date of Dec. 31, 2005; and U.S. application Ser. No. 11/735,136 for United States patent entitled ENHANCEMENT OF VISUAL PERCEPTION II filed on Apr. 13, 2007.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The field of the invention pertains to systems, devices, and methods for enhancing the visual perception of a viewer in a two-dimensional image, which includes enhancement of the viewer's perception of depth and clarity in a two-dimensional image. This field of invention is distinct from that of Garcia, U.S. Pat. No. 5,510,832: synthesized stereoscopic imaging from two-dimensional images. Garcia adequately discusses the utility and merits of simulation of 3D video from two-dimensional video sources. The field of the present invention is also distinct from that of Ashbey, U.S. Pat. No. 5,541,642: stereoscopic imaging with interlaced video through a lenticular decoder screen. Ashbey also discusses derivation of stereoscopic effects from a "monoscopic" source by simultaneously displaying successive frames of a motion picture with lateral displacement through his system.

The use of the terms "two-dimensional", "monoscopic", and "monocular" have been used in the prior art to distinguish the viewing of single images from that which is "stereoscopic"—the quality of vision with which a human viewer with two normal eyes and the ability for stereopsis sees a scene in physical (three-dimensional) space with objects at varying distances from the viewer. However, some clarification of these terms is necessary. The term "two-dimensional" as an adjective for the term "image" does not mean that the image does not represent a three-dimensional scene, i.e. a scene with visual cues for depth related to objects and surfaces at varying distances within the perspective of the scene. The term "three-dimensional" or "3D" as applied to an image does not necessarily mean that it is stereoscopic, but may also mean that it is an image displayed on a two-dimensional surface, flat or curved, and/or which may be manipulated so that the objects represented therein are viewable at different angles, either by rotation of the object or the variation in the angle of view with an apparent change in position of the viewer. The term "monocular", which literally means "having only one eye" or "with one eye" (in contrast with "binocular", meaning with two eyes), sometimes used as a synonym for "two-dimensional", is used to describe an image which appears to be displayed on a two-dimensional surface (as when a physical scene of objects at varying distance from the viewer is viewed with one eye), and is also used in the prior art terms "monocular cues" and "monocular depth cues" to describe certain aspects of a two-dimensional display of a three-dimensional scene which indicate the varying distances and angles of objects with reference to the view represented therein. The term "monoscopic" appears to be used in the prior art as a synonym for "monocular", particularly in Ashbey, but is not defined as such in common usage.

The subject of "depth perception of images on a television screen" has been discussed in LeMay, U.S. Pat. No. 5,488,510, but not the subject of depth perception in other types of two-dimensional images, such as posters, paintings, signs, still photographs, cinema, etc. LeMay uses a window screen type mesh in a device to be worn by a viewer through which a two-dimensional television image is viewed, and creates, according to its inventor, an "illusion". Unlike LeMay, the present invention, in its preferred embodiments, does not require any type of eye wear or worn device, and provides a natural stereo vision experience in the viewing of two-dimensional images of all kinds, including photographs, posters, drawings and paintings, signs, television and motion pictures, and projected images in general. Also, unlike LeMay, the present invention does not rely upon an "illusion", but enhances the viewer's perception of depth in the monocular depth cues and perception of clarity in a two-dimensional image.

Also relying on an "illusion" for its attempt to give the "effect of enhanced depth perception" is Shanks, U.S. Pat. No. 5,806,218, entitled "Border for an Image", which provides a patterned border for a two-dimensional image claimed to appear closer to the viewer than the two-dimensional image, and to thus suppress "flatness cues in the image" and create an "illusion of depth" in the image. Similar to Shanks in relying on an "illusion" is the "Stereoscopic Enhancement of Pictorial Displays" of Henkes, U.S. Pat. No. 3,701,581, which provides a "frame" which "obscures and/or confuses, in the mind of the viewer, the location of the transitional area between pictorial information and its surrounding environment"—"by defocusing the edge of the frame". Unlike Shanks and Henkes, the present invention does not rely upon confusion of spatial location of the two-dimensional image to create an "illusion" of depth at the cost of the focus of the image and the clarity to the viewer, but enhances the viewer's perception of depth in the monocular depth cues without sacrificing the viewer's focus on the image or its location in space.

The present invention should be distinguished from stereographic devices and methods providing stereoscopic vision which require simultaneous or alternated display of two two-dimensional images, still or motion picture, each image being of one of two monocular views, actual or simulated, of a binocular view of a scene, which must be viewed with special viewing glasses or display lens; whereas the present invention involves the display of only one two-dimensional image, still or motion picture, of a single monocular view of a scene.

It is to be noted that the stereo vision provided by the prior art is artificial in appearance as discussed in Garcia. Stereographic devices have been well known for many years, while the principle underlying the present invention, although not yet completely understood, is newly presented in this application.

The present invention should also be distinguished from the well-known effect that is observed with monocular viewing of a two-dimensional image with monocular depth cues against a featureless or flat background without such cues. The same effect can also be observed by monocular viewing of a two-dimensional image at the end of an enclosed space. With such a viewing the monocular depth cues in the two-dimensional image become pronounced, albeit seen with only one eye. Such monocular viewing, however, not only involves the discomfort of viewing with only one eye, but more importantly deprives the viewer of the accommodation reflex which occurs with binocular vision that gives the viewer the ability to accurately focus on the two-dimensional image. The result is that although, with such monocular viewing, the monocular depth cues in the two-dimensional image have an effect greater than if viewed binocularly, the two-dimensional image cannot be seen with the same degree of focus as if seen binocularly. The present invention operates very differently: the viewer's depth perception and perception of clarity in a two-dimensional image is enhanced by inducing a retinal disparity in the viewer that results in a fusion experience. With the present invention the two-dimensional image can be seen binocularly with the accurate focus of the accommodation reflex. Such accurate focus in turn heightens the fusion experience, and thus the enhancement of depth perception and perception of clarity afforded by the present invention.

As previously indicated, the present invention provides enhanced perception of clarity for the viewer in a two-dimensional image. This effect became known from the assertions of many viewer-subjects during the testing of the depth perception enhancement effect: that the two-dimensional images they viewed with the invention were "clearer" than without the system. Such an effect appears to have a basis in the notions of eye dominance and binocular retinal rivalry.

The enhancement of clarity of the present invention should be distinguished from eye wear, lens systems, and surgical procedures for gaining improved focus of images on the retina, which are all well-known. Distinction should also be made between the present invention and eye exercise systems, discussed extensively in Liberman, U.S. Pat. No. 6,742, 892 (along with an informative tract on eye anatomy, function and optics), which are primarily concerned with the improvement of eye tracking, convergence and accommodation.

The classification that applies to this aspect of the invention is generally in U.S. Class 359, "OPTICAL: SYSTEMS AND ELEMENTS", but the only subclass titles that provide a verbal similarity are 462, "STEROSCOPIC", and 478, "RELIEF ILLUSION", the descriptions of neither being applicable to the theory of operability of the present invention. Other classification has been applied to United States patents involving various illusions to effect depth perception enhancement, particularly U.S. Classes 40/427 and 350/144, and International Classes G02B 7/22 and GB02B 27/22. U.S. Class 351, "OPTICAL: EYE EXAMINING, VISION TESTING AND CORRECTION" may also apply. Otherwise, the patent classification system does not contain a classification for the invention in the phenomena employed.

SUMMARY OF THE INVENTION

The present invention provides enhancement of a viewer's visual perception in a single two-dimensional image, which includes enhancement of the depth perception of a viewer in various types of two-dimensional images that include monocular cues for depth, and thereby the experience of stereo vision in the viewing by such enhancement of the viewer's perception of those monocular depth cues. Such an enhancement is effected by the present invention with the induction of a slight but sufficient retinal disparity in the viewer's view of the two-dimensional image. Such a retinal disparity is experienced by a viewer with a normal capacity for stereopsis as the fusion of retinally disparate images which include the two-dimensional image, the "enhancement effect" of the present invention. That is, the present invention so enhances the viewer's perception of the monocular depth cues in a single two-dimensional image as to cause the viewer to experience the fusion of stereo vision. Also included in the invention is the enhancement of the "clarity" with which the viewer perceives a two-dimensional image, that is, an increase in resolution of the two-dimensional image as perceived by the viewer.

The present invention comprises the creation for the viewer of what is referred to herein as a "enhanced scene" which includes the two-dimensional image, by the inclusion in the scene before the viewer of the image of a physical visually identifiable object, i.e. a virtual visually identifiable object, generated by an Enhancer, at one or both sides and to the front of the two-dimensional image, configured within certain parameters as a system. The Enhancer is a device which generates a virtual visually identifiable object autostereoscopically, such as holographically, by projection, or lenticular display. Such an enhanced scene within which the two-dimensional image is presented for binocular viewing induces a retinal disparity in the viewer which is spatial as the result of the binocular viewing of the enhanced scene, and is slight but sufficient to cause the viewer to experience the enhancement effect.

The currently preferred virtual visually identifiable object for the system is a vertical strip or bar, positioned in the space in front of the two-dimensional image and before the viewer, a pair of which may partially frame the vertical sides of the two-dimensional image in the viewer's view. The positioning of the virtual visually identifiable object is generally governed by the horizontal dimension of the two-dimensional image in relation to other parameters of the system, and may be within the depth of field of focus and/or Panum's fusional region for the viewer of the two-dimensional image. The virtual visually identifiable object generated by the Enhancer may have other features, such as luminosity, shape, color, etc. that can add to the enhancement effect by combination and/or control with reference to the qualities of the two-dimensional image and the viewer's vision.

The system may include means for obscuring the edge of the two-dimensional image, where the edge of the two-dimensional image will detract from the enhancement effect; and also may include a background for the enhanced scene to prevent the diminution of the enhancement effect by the visual environment in which the system is operating.

DETAILED DESCRIPTION OF THE INVENTION

Figure 1:
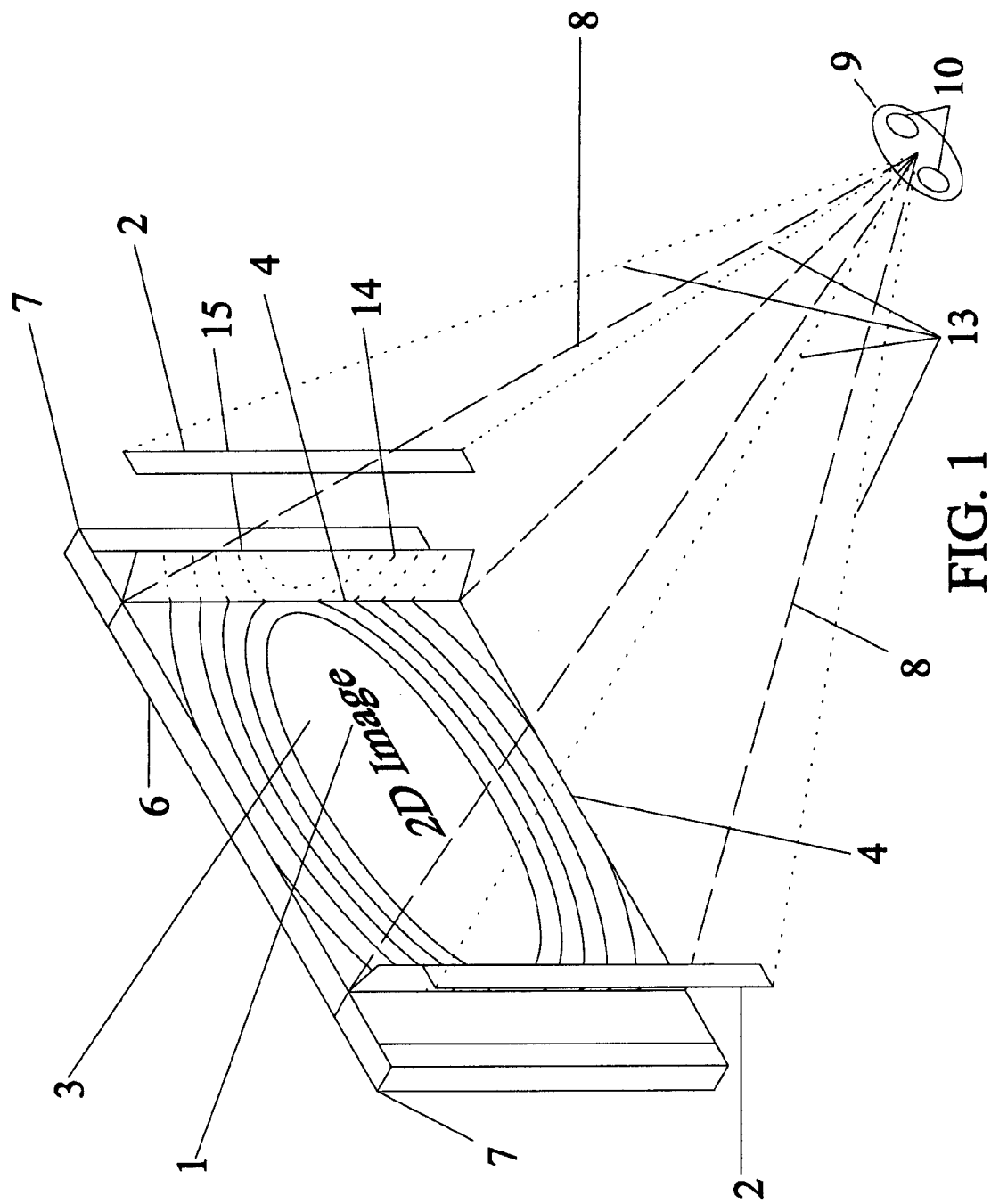
FIG. 1 is a perspective view of an embodiment of the system with a pair of Enhancers that generate a virtual visually identifiable object by holographic projection or by lenticular display.

The present invention provides enhancement of a viewer's visual perception in a single two-image, which may be of any kind, including photographs, posters, drawings, paintings, signs, television and computer images; and all forms of front and rear projection images, film or electronic, still or motion; however viewed, either directly or by other means; or whether generated or displayed mechanically, optically, or electronically (hereinafter referred to as "2D image"). The enhancement of visual perception includes enhancement of the depth perception of a viewer in various types of 2D images that include monocular cues for depth, and thereby provides the experience of stereo vision in the viewing by such enhancement of the viewer's perception of those monocular depth cues. Such an enhancement is effected by the present invention with the induction of a slight but sufficient retinal disparity in the viewer's view of the 2D image. Such a retinal disparity is experienced by a viewer with a normal capacity for stereopsis as the fusion of retinally disparate images which include the 2D image, the "enhancement effect" of the present invention. That is, the present invention so enhances the viewer's perception of the monocular depth cues in a 2D image as to cause the viewer to experience the fusion of stereo vision. Also a part of the enhancement effect and included in the invention is the enhancement of the "clarity" with which the viewer perceives a 2D image, that is, the increase in resolution of the 2D image with an accompanying increase in brightness and color intensity as perceived by the viewer.

The invention may be used with all types of display of 2D images wherein the enhancement of depth perception of the viewer increases the intelligibility of the image to the viewer, such as in medical imaging and computer graphic displays, as well as in entertainment (motion pictures and television), cultural (drawings, paintings, photographs, etc.), and commercial (posters, billboards, etc.) applications. The invention may also be used for scientific purposes as probe of the human visual system, particularly the visual cortex and the brain-eye connection, as well as the phenomena of vision generally. The principal objects of the invention are to provide: 1) enhancement of the depth perception of a viewer in various types of 2D images that include monocular cues for depth, and 2) enhancement of a viewer's perception of clarity in various types of 2D images generally.

The present invention provides a system for enhancing a viewer's visual perception in a 2D image by the creation for the viewer of the 2D image of what is referred to herein as an "enhanced scene", which includes the 2D image displayed and at least one virtual visually identifiable object (hereinafter referred to as a V-VIO) generated by an Enhancer to be in front of and to one or both sides of the two-dimensional image. The V-VIO is thus referred to as virtual, because it is not a real physical object in the sense of being solid, liquid or gaseous. A V-VIO is a visual image simulation of a physical visually identifiable object positioned to the front of the 2D image. An Enhancer is a device which generates a V-VIO to the front of the two-dimensional image autostereoscopically. A V-VIO may be generated by an Enhancer with well known autostereoscopic technology: either holographically, as with a holographic display by appropriate illumination of a hologram, hereinafter referred to as a "holographic device"; or by projection, as with concave mirror projection of an image displaced from the source object of the image, hereinafter referred to as a "concave mirror projection device"; or with one of the forms of lenticular display, such as interlaced images of binocular views of a visually identifiable object viewed binocularly through a grating/lens as separate images, hereinafter referred to as a "lenticular device"; or may be otherwise equivalently generated as a real image (in the sense of its use in the science of geometrical optics) with yet unknown or undeveloped technology; all of such devices being referred to hereinafter as "autostereoscopic devices". The enhanced scene is configured within a range certain parameters with the 2D image, such as the horizontal width of the 2D image, the horizontal width of the V-VIO, the distance of the V-VIO from the 2D image, and the viewing distance. Such an enhanced scene within which the 2D image is presented for binocular viewing induces a retinal disparity in the viewer which is spatial (as contrasted with temporal, i.e. by the 2D image changing in time) as the result of the binocular viewing of the enhanced scene, and is slight but sufficient to cause the viewer to experience the enhancement effect.

The currently preferred virtual visually identifiable object to be generated by the Enhancer for the system has the shape of a vertical strip, bar, band, or stripe, etc., hereinafter referred to as a "bar V-VIO". A V-VIO may have other features, such as illumination, shape, and color, that can add to the enhancement effect by combination and/or control with reference to the qualities of the 2D image and the viewer's vision. Different types of bar V-VIO may be used effectively, depending on the application for the invention. A bar V-VIO may be used singly or in groupings, such as in a pair which brackets the two dimensional image in the viewer's view of the enhanced scene, and may be said to partially frame the 2D image in the view of the viewer.

The system may include means for obscuring the edge of the 2D image, where the edge of the 2D image is sufficiently well defined to detract from the enhancement effect; and may also include a background mask for the enhanced scene to prevent the diminution of the enhancement effect by the visual environment in which the system is operating.

The present invention enhances the depth perception of a viewer in various types of 2D images that include monocular cues for depth, and enhances the "clarity" with which the viewer perceives a 2D image. The term "clarity" is used herein to mean the resolution with which the 2D image is perceived by the viewer, and not the focus of the 2D image. The effect of these enhancements shall hereinafter be referred to as the "enhancement effect". However, the enhancement effect being twofold, the aspects thereof shall be referred to as the "depth perception enhancement effect" and the "clarity enhancement effect" when the distinction is necessary. Otherwise, the term "enhancement effect" should be understood to mean either or both, depending on the context.

The present invention is partially described herein as a system, because the V-VIO, although generated by a device within the system, the Enhancer, receives its identity and function according to an interactive visual relationship with the other elements of the system and/or the visual system of a viewer. The term visual system shall be taken to mean the human visual system, including the eyes and all of their internal structures, the optic nerves, all neural structures associated with all other functions of eye movement, protection, or control; and all neural structures by which data collected by the eyes is processed, recorded and interpreted, including the human brain, particularly the visual cortex.

As a foundation for understanding the invention and the nature of the enhancement effect, the following generally accepted definitions and principles related to the human visual system and visual perception may be considered:

1. Accomodation reflex: The reflexive activity of the human visual system whereby adaptation of the eyes occurs to facilitate focusing, including the increase in the curvature of the lenses and pupilary constriction, in response to convergence of the eyes in fixation on a target object.
2. Point of Fixation (Point of Regard): Point or object on which the eyes are directed and one's sight is fixed.
3. Fovea: Point on the retina on which are focused the rays coming from an object directly regarded, i.e. from the point of regard.
4. Monocular depth cues: Visual cues which present information about the relative location of objects using one eye, which include: occlusion or interposition; aerial perspective (atmospheric perspective, aerial haze); linear perspective (convergence of parallel lines); relative height; texture gradients; shading and light; relative size; relative motion (monocular movement parallax); and familiar size.
5. Retinal disparity: Differences between two or more images projected on the retina of the eye with reference to the fovea of the retina; the difference in the retinal images that results from retinally disparate points of retinal images detected in the visual cortex which, if within Panum's fusional area (zone of single binocular vision), can be fused resulting in single vision.
6. Fusion: Neural process commonly referred to as stereoscopic vision (or stereo vision) thought to occur in the visual cortex that brings two retinal images to form a single image which is known as the single cyclopean image.
7. Panum's fusional region (Panum's fusional space): Region in visual space over which humans perceive binocular single vision derived from the fusion of binocular retinal images. (Outside Panum's fusional region physiological diplopia occurs.)
8. Panum's fusional area: Area on the retina of one eye, any point on which, when stimulated simultaneously with a single specific slightly disparate point in the retina of the other eye, will give rise to a single fused image.
9. Retinally disparate points: Retinal points which can give rise to different principal visual directions, which, when within Panum's fusional area (zone of single binocular vision), can be fused resulting in single vision.
10. Retinally disparate images: Retinal images which are comprised of retinally disparate points.
11. Stereopsis: Ability to perceive depth produced by retinal disparity within Panum's fusional area requiring properly functioning binocular cells thought to exist in the visual cortex: the ability to distinguish the relative distance of objects resulting from the lateral displacement of the eyes that provides two slightly different views of the same object (disparate images).
12. Binocular retinal rivalry: Alternating suppression of the two eyes resulting in alternating perception of the two retinal images.
13. Visual field: The angular width of space that may be visually observed from the eye of a human viewer, normally 145 to 155 degrees.
14. Field of view: The angular width of space that may be visually observed by a human viewer, normally 180 to 190 degrees for a viewer with two eyes with normal visual fields.
15. Binocular field of view (Binocular visual field): The angular width of space within the overlap of the visual fields of a human viewer with two eyes, normally 120 to 140 degrees for a viewer with normal visual fields.
16. Autostereoscopic viewing: Stereoscopic viewing without the aid of glasses, goggles, or other worn viewing aids.
17. Autostereoscopic device (display): A device (display) that presents a viewer with stereoscopic viewing without the aid of glasses, goggles, or other worn viewing aids.
18. Real image: (From geometrical optics) An image which is visually observed from light rays which diverge from the points in space at which the image is located.
19. Virtual image: (From geometrical optics) An image which is visually observed from light rays that do not diverge from the points in space at which the image is located.

With respect to depth perception enhancement, the present invention provides a viewer who has the capacity for stereopsis with the experience of stereo vision in the viewing of a single 2D image by enhancing the viewer's perception of depth in the monocular depth cues in the 2D image; that is, the depth perception enhancement effect of the present invention so enhances the viewer's perception of the monocular depth cues in a single 2D image as to cause the viewer to experience the fusion of stereo vision with respect to the content of that 2D image. With respect to the clarity enhancement, the present invention provides a viewer who has the capacity for stereopsis with enhancement of the viewer's perception of clarity in viewing a 2D image, even without the presence of monocular depth cues therein. Such enhancements are effected by the present invention with the induction of a slight but sufficient retinal disparity in the viewer. When occurring on Panum's fusional areas, such a retinal disparity is thought to be experienced by a viewer with a normal capacity for stereopsis as the fusion of binocular views of the 2D image. The theoretical foundation for the clarity enhancement effect also resides in the phenomena of eye dominance in humans, i.e., the dominant eye more strongly contributes to binocular vision than the other, and is said to be the eye that looks directly at an object; and the phenomena of binocular retinal rivalry, i.e., alternating perception of the two retinal images—indicating that the retinal image from only one eye at a time is being neurally recorded in the visual cortex. If it is the fusion of slightly disparate retinal images in the visual cortex that provides the experience of stereo vision, then a diminution of the strength of one of such images in the visual cortex must diminish the experience. Therefore, if one eye is dominant, greater viewer attention to binocular vision, with consequently greater contribution by the non-dominant eye, may be required for a full perception of binocular cues. In ordinary viewing of a two-dimensional image (without the use of the present invention) the viewer's attention in the two-dimensional image is probably relaxed, because no significant retinal disparity results from the viewing of a two-dimensional image directly, that is, along a line-of-sight which is substantially perpendicular to the two-dimensional image. Such relaxation in attention appears to decrease the contribution that the retinal image from the non-dominant eye makes to the single cyclopean image (said to be the result of the fusion of the two retinal images in the visual cortex). However, greater attention in a 2D image seems to occur with the use of the present invention, and thus greater contribution to the cyclopean image by the non-dominant eye. This greater contribution by the retinal image of the non-dominant eye is a product of and carries with it the stimulus of the rods and cones of the non-dominant eye, thus increasing by as much as two-fold the number of stimulus points contributing to the cyclopean image with fusion of the retinally disparate images in the visual cortex. With such an increase in stimulus points being fused in the visual cortex, the resolution of the cyclopean image in the visual cortex is increased, hence the increase in the "clarity" of the 2D image experienced by the viewer, the clarity enhancement effect.

The present invention is here exemplified in various embodiments which produce the enhancement effect for the viewer of a 2D image by a fusion experience resulting from the viewing of an enhanced scene that includes a 2D image and a V-VIO generated by an Enhancer, the device within the system, which causes a retinal disparity in the viewer. The present invention and its underlying principle may be understood with reference to the drawings of the examples shown in FIGS. 1-2, which is operative with all types of 2D images. FIG. 3 shows the configuration parameters pertinent to the invention generally and all of the exemplary embodiments. In the various drawings it should be noted that the reference numerals for certain elements of the system are the same throughout the drawings where the function of such elements remains the same.

The 2D image 1 is referred to as such because it is substantially representable using coordinates of only two dimensions, regardless of the shape of the image surface 3, such as on an embossed surface, a surface having a discernable texture, or the surface of a relief. The term "2D image" as used in this disclosure may represent a three-dimensional scene, which is a scene with one or more monocular depth cues related to objects and/or surfaces at varying apparent distances from the viewer. A 2D image need not have any monocular depth cues in order for it to be viewed with the clarity enhancement effect; but in order to be viewed with the depth perception enhancement effect, the 2D image must have at a minimum some monocular depth cue, even if only contrived for that purpose. The term "monocular", which literally means "having only one eye" or "with one eye", is not used in this disclosure as a synonym for "two-dimensional" as used in the term "2D image", and is specifically excluded from the meaning of "2D image" as used in this disclosure. However, the common meaning of "monocular" is used in this disclosure to describe an image of a physical scene of objects when viewed with one eye (and thereby may appear to be displayed on a two-dimensional surface), as well as with reference to "monocular cues" or "monocular depth cues".

The surface upon which a 2D image is presented shall be referred to as the "image surface" 3, which may be flat, faceted, horizontally and/or vertically curved, spherical, or some other shape, and may be a surface which is not associated with a solid physical object, such as a sheet flow, spray of liquid, or cloud of vapor; or may be a surface defined by the 2D image in physical space not associated with any physical object at all. An object 6 upon which an image surface 3 may exist shall hereinafter be referred to as the "image object" 6, and may be solid, liquid or gaseous.

For the purpose of this disclosure the term "horizontal", as referred to in all its derivative forms (such as "horizontally" as used hereinabove), shall mean a direction substantially parallel to the orientation of the viewer's eyes, i.e. in the direction of the line joining the center of the viewer's eyes, even though not horizontal in relation to the earth's surface; or the direction of a component of the distance vector between two points in space (from the vector representation of location, wherein the distance vector of a location is resolved into two component distance vectors at right angles, the magnitude of the resolved vector being the magnitude of the hypotenuse of the right triangle formed by the resolved distance vector with its components) that is substantially parallel to the orientation of the viewer's eyes. Consequently, the term "vertical", as referred to in all its derivative forms as well (such as "vertically"), shall mean a direction substantially within the plane perpendicular to said horizontal direction and substantially perpendicular to the direction of view of the viewer.

Figure 2:
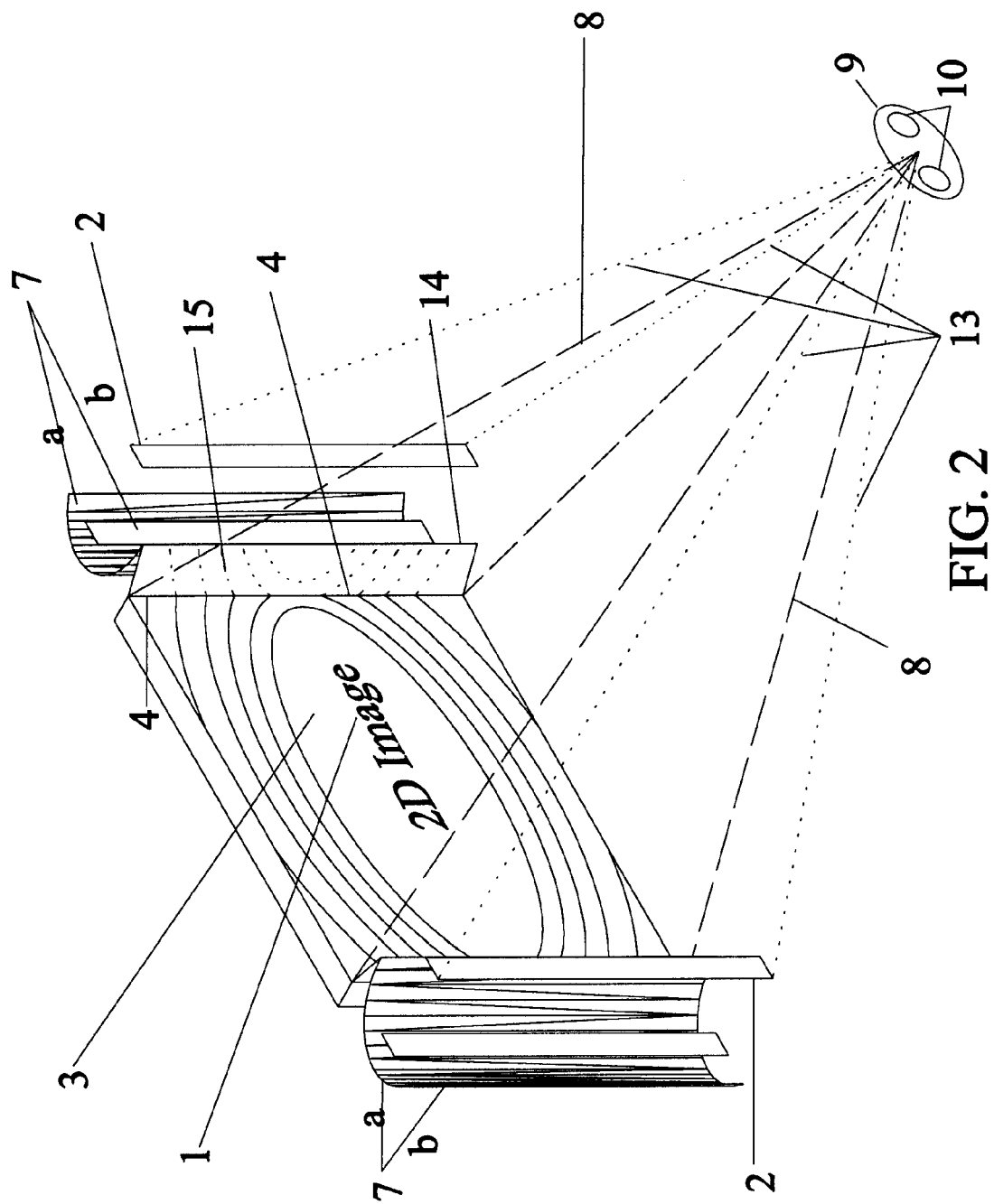
FIG. 2 is a perspective view of a mechanical embodiment of the system for front projection with a pair of Enhancers that generate a virtual visually identifiable object by concave mirror projection.
Figure 3:
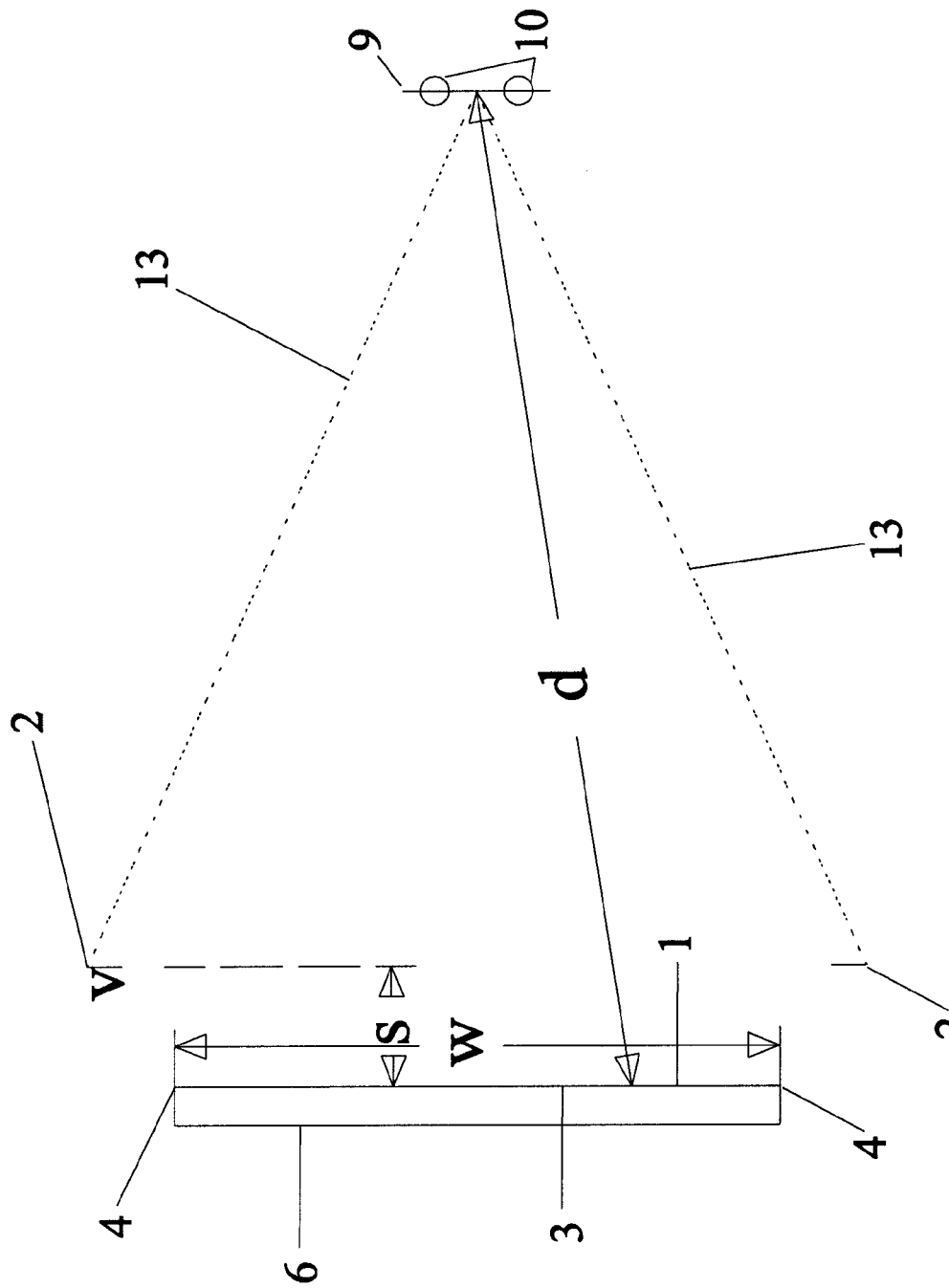
FIG. 3 is a schematic plan view of the embodiments shown in FIGS. 1 and 2 showing the configuration parameters.

Referring to the examples of the invention shown in FIGS. 1 and 2, the system for enhancement of visual perception includes a 2D image 1 with an edge 4 which is displayed on an image surface 3, which may be located on an image object 6, and an Enhancer 7, the device within the system. As previously indicated, the term "Enhancer" is defined for use in this Application as that which generates a V-VIO 2, a virtual visually identifiable object which is visual image simulation of a physical visually identifiable object. In FIG. 1 the Enhancer 7 is an stereoscopic device, i.e. a lenticular device or a holographic device, which generates the V-VIO 2. In FIG. 2 the Enhancer 7 is a concave mirror 7a which produces an image, the V-VIO 2 displaced from the source object 7b of the image, a concave mirror projection device.

A V-VIO 2 is not a distortion in human visual perception, such as an illusion or mirage that is the product of an impairment or confusion of the viewer's visual system in focusing or convergence, but an actual image which may be focused upon and located in space by the human visual system. As such a V-VIO is: 1) an entity distinct from the 2D image; 2) shaped so as to be identifiable; and, 3) visually discernable by the viewer as a distinct. A V-VIO may also be: 1) physically separated in space from the 2D image and the image surface; 2) visually locatable by the viewer to be separate in space from the 2D image and the image surface; 3) delineated from the 2D image; 4) distinguishable from the 2D image; 5) with boundaries that are distinguishable from the content of the 2D image behind it; 6) not masked by the content of the 2D image behind it; and/or 7) as visually prominent to the viewer as the 2D image. "In front" of the 2D image 1 means the side of the image surface 3 from which the 2D image is viewed by the viewer 9, and before and within the view 8 of the viewer 9 of the enhanced scene 13, regardless of the orientation of the image surface 3, but not necessarily between the 2D image 1 and the viewer 9. Thus, a V-VIO "in front" of the 2D image does not imply that any part of a 2D image is blocked from the viewer's view by the V-VIO.

The positioning of the V-VIO is generally governed by the horizontal dimension of the 2D image in relation to other parameters of the system, and may be within the depth of field of focus and/or Panum's fusional region for the viewer of the 2D image. Thus, the invention may be described in terms of certain parameters of the system, as shown in FIG. 3: the horizontal width (horizontal dimension) of the 2D image (w); the average distance from the viewer to the points of fixation of the viewer on the image surface (also referred to herein as the "viewing distance") (d); the distance of the V-VIO from and in front of the image surface, measured along a line from the center of the image surface and perpendicular thereto (also referred to hereinafter as the "V-VIO distance") (s); and the horizontal width (horizontal dimension) facing the viewer of the vertically oriented parts of the V-VIO (also referred to hereinafter as the "VIO width") (v). All of these parameters may be established for a human viewer with normal eye separation, normal binocular field of view, and whose eyes are within the normal range of viewing elevation with respect to the horizontal midline of the 2D image. Such establishment of these parameters for a human viewer with substantially normal vision is not meant to imply that the enhancement effect of the system would not be available to persons whose vision was abnormal. However, the viewer's experience of the enhancement effect will vary with the visual ability of the viewer, particularly the viewer's capacity for stereopsis.

These parameters are conveniently established by reference to certain ratios between them, with ranges specified for such ratios. The ratios are: s/w (or s:w), the ratio of the distance of the V-VIO from and in front of the image surface, to the horizontal width of the 2D image; v/w (or v:w), the ratio of the horizontal width of the V-VIO, to the horizontal width of the 2D image; s/d (or s:d), the ratio of the distance of the V-VIO from and in front of the image surface, to the average distance from the viewer to the points of fixation of the viewer on the image surface; w/d (or w:d), the ratio of the horizontal width of the 2D image, to the average distance from the viewer to the points of fixation of the viewer on the image surface; v/s (or v:s), the ratio of the horizontal width of the V-VIO, to the ratio of the distance of the V-VIO from and in front of the image surface; and v/d (or v:d), the ratio of the horizontal width of the V-VIO, to the average distance from the viewer to the points of fixation of the viewer on the image surface. It is apparent that the ratios are mathematically interrelated, so that establishment of a range for three of the ratios which include all four parameters also establishes the ranges for the other three ratios. The ratios that are convenient to use are s/w, v/w, and s/d. In the case where the horizontal width of the 2D image (w) is selected or otherwise fixed, and the range of the viewing distance is determined by the space in which the 2D image is to be displayed, for example, these ratios provide the means for calculating the permissible ranges for the V-VIO width (v) and the V-VIO distance (s) in order for the system of the present invention to produce the enhancement effect for a viewer in the space. The values of the V-VIO width (v) and the V-VIO distance (s) should be selected so that the values of these ratios lie within the following set of numerical ranges: $0.5 \geq s/w \geq 0.05$; $0.05 \geq v/w \geq 0.01$; $0.2 \geq s/d \geq 0.02$. Thus, if none of the parameters are determined, any combination of the parameters s, w, v, and d that satisfy these ratios are permissible. However, as previously indicated, the enhancement effect experienced will vary from viewer to viewer dependent on the viewer's visual system and the acuteness of the viewer's capacity for stereopsis, the extremities of the ranges allowing for such acute capacity. The preferred set of numerical ranges for the values of these ratios is as follows: $0.3 \geq s/w \geq 0.07$; $0.035 \geq v/w \geq 0.01$; and $0.12 \geq s/d \geq 0.03$; and can produce the enhancement effect for a viewer with a moderately acute capacity for stereopsis. The more preferred set of numerical ranges for the values of these ratios is as follows: $0.2 \geq s/w \geq 0.1$; $0.03 \geq v/w \geq 0.01$; and $0.1 \geq s/d \geq 0.04$; and can produce the enhancement effect for a viewer with a average capacity for stereopsis. The optimum set of numerical ranges for the values of these ratios is as follows: $0.16 \geq s/w \geq 0.12$; $0.025 \geq v/w \geq 0.012$; and $0.07 \geq s/d \geq 0.045$; and can produce the enhancement effect for a viewer with a moderate capacity for steropsis. Some examples of the values of the parameters for the invention with various widths (w) of the 2D images that satisfy these ratios within the optimum set of numerical ranges are as follows: for w=55, v=1, s=8, and d=132; for w=84, v=2, s=12, and d=240; for w=300, v=4, s=40, and d=600; where the values of the parameters for these examples of the invention are measured in inches. With the parameters w, d, v, and s consistent with the ranges of the above ratios it is possible for the viewer 9 to see the V-VIO and the 2D image at the same time within the viewer's binocular 13 of view, and the V-VIO to be a sufficient distance from the 2D image 1 to render two slightly disparate images of the combined scene 13 in the binocular view of the viewer, one on the retina of each of the veiwer's 9 eyes 10, so as to experience some enhancement effect. With the choice of value of any one of the four parameters w, d, v, or s, ranges for the remaining parameters may be calculated by substitution in one of the appropriate ratios above, and the system accordingly implemented with each parameter within the calculated range. As indicated, although a specific value for the average distance (d) is chosen to satisfy the ranges of the ratios, a viewer will experience the enhancement effect for a wide range of distances from 2D image as long as the V-VIOs are within the binocular field of view of the viewer.

With the system operating within the ranges defined above, corresponding points of the enhanced scene 13 are projected on the retinas of the viewer's 9 eyes 10 and generate a fused cyclopean image of the enhanced scene 13 in the viewer 9. Such a fused cyclopean image of the enhanced scene 13 in the viewer 9 includes the viewer's view 8 of the 2D image 1 and provides the viewer 9 with the experience of stereo vision, not simply by distinguishing distance between the 2D image 1 and the V-VIO 2, but within the 2D image 1 itself, by enhancing the viewer's perception of depth in the available monocular depth cues within the 2D image 1. This enhancement effect suggests that the human brain has the capacity to reconstruct and appreciate stereo vision in a two-dimensional image by the stimulation to fusion in the visual cortex of a retinal disparity presented by the binocular depth cue of the enhanced scene.

The invention is designed to be effective to enhance depth perception and/or clarity perception in a 2D image for a viewer who has two eyes and a relatively normal ocular and neural capacity for stereopsis. However, the intensity of the enhancement effect will vary with the level of such capacity in the viewer. In this respect the invention may also serve as an experimental probe for the phenomena of visual perception, both binocular and monocular.

The experience of stereo vision provided by the present invention is superior to the prior art in that the cyclopean images experienced with the present invention do not suffer from the defects described in the prior art, but are as natural as normal stereo vision to the viewer. The experience is natural because the experience is with the viewer's own eye separation and capacity for stereopsis.

A V-VIO may have any shape, and may also be flat or curved, horizontally and/or vertically. The placement of an Enhancer 7 may be by any means, such as suspension in position with or attachment to the image object 6. The positioning of the V-VIO 2 is determined by the internal operation or arrangement of the Enhancer 7, and may be fixed or adjustable with respect to distance from and angle with the image surface 3.

In an enhanced scene an Enhancer 7 is operably associated with the image surface 3 in order to produce an appropriately positioned V-VIO 2, and thus the enhancement effect. Such status of an Enhancer is also intended to mean herein that the Enhancer is not physically connected to or with the viewer, either by attachment to or being worn by the viewer.

The visibility to the viewer of well defined edges 4 of a 2D image tends to announce the 2D image as flat in the space in front of the viewer, in contrast to other binocular cues within that viewing environment, and thus detracts from the enhancement effect. This tendency shall hereinafter be referred to as the "edge effect". The edge effect can be diminished by decreasing the prominence of the edges 4 of a 2D image 1, which shall hereinafter be referred to as "edge obscuring", one means for which are edge obscuring panels shown in FIGS. 1 and 2. A device employed to accomplish edge obscuring shall be referred to as an "edge obscuring" device. Various means maybe employed to obscure the edge of the 2D image 1 using the light from the 2D image 1. In the examples shown in FIGS. 1 and 2, the 2D image 1 can be bounded at one or more of its edges 4 by edge obscuring panels 14, 15, so that light from the 2D image 1 is wholly or partially reflected or transmitted toward the viewer 9. Such an edge obscuring panel 14 may have other optical qualities that diffuse or distort light reflected from the 2D image 1 in order to more smoothly obscure the edge of the 2D image 1.

The enhancement effect may be intensified and/or maintained by generation of the V-VIO with luminosity by the Enhancer. The luminosity of the V-VIO may be of various colors and intensities, and/or may be polarized; and the color, intensity and/or polarization of the illumination may be variable over time. Such variation in the illumination may be programably controlled with reference to the characteristics of the 2D image, such as brightness, coloration, resolution, shape, program material, monocular depth cues, etc.; and/or controlled with reference to the characteristics of the viewer's vision.

Where the 2D image is not produced on an illuminating device, such as a television monitor, light box, or projection screen, the enhancement effect of the system may also be improved by illumination of the 2D image. Such illumination of the 2D image may be from sources attached to or independent of the Enhancer, and may be controlled in a manner similar to the luminosity of the V-VIO.

All of the various attributes of the 2D image and the V-VIO may be enhanced and controlled to accommodate the position and vision characteristics for the viewer and to intensify and/or maintain the enhancement effect with respect to the various characteristics of the 2D image; and the entire range of such combination and control is included in the invention. Such control of the system may also be programmed to achieve specific effects in the 2D image, and/or associated with the generation of the 2D image, such as a broadcast signal, or on a recorded track, such as videotape, compact disc, digital video disk, digital video recorder, or on a motion picture film. Such programming may even be composed for presentation of the entire range of 2D images with which the system may be practiced, preexisting as well as contemporary with the composition.

The method for enhancement of visual perception of the present invention, which the present invention is designed to practice, and which includes the creation for the viewer of an enhanced scene, therefore involves the selection of the elements of the enhanced scene: the 2D image which is the subject of the enhanced scene; the surface upon which it is to be displayed, the Enhancer, and the spatial relationships of those elements reflected in the system parameters, w, d, v, and s previously defined. For depth perception enhancement, it is necessary that the 2D image have monocular depth cues, but such monocular depth cues are not necessary for clarity enhancement. Among the monocular depth cues to be considered in the selection for depth perception enhancement of a 2D image as the subject of an enhanced scene are occlusion or interposition, aerial perspective, linear perspective, relative height, texture gradients, shading and light, relative size, relative motion, and familiar size. In addition to monocular depth cues, other characteristics of the 2D image may be considered in the analysis, such as the inherent clarity of the 2D image, the level of illumination depicted within the 2D image, the number of objects in the 2D image, the similarity of objects in the 2D image, the randomness or order of the objects in the 2D image, and the inherent resolution of the 2D image; and, in the case of moving 2D images, the steadiness of the 2D image, the rapidity of movement within the 2D image, the duration of the cuts (the period of uninterrupted action) in the 2D image, and the length of time that monocular depth cues exist uninterruptedly in the scenes of the 2D image. The method may also include the taking into consideration of the angle from which the 2D image is being viewed. The 2D image is then presented on an image surface selected for the 2D image. One or more Enhancers to be used with the 2D image as displayed (its type, size, etc.), and its mode of operation (coloration, illumination, motion, programming, etc.) may then be selected for the desired enhancement effect. The V-VIO generated by the Enhancer together with the 2D image presents an enhanced scene to a viewer's visual system as an image on the retina of each eye of the viewer with a spatial retinal disparity. The visual system of the viewer of the 2D image is caused by the constitution of the enhanced scene to be subjected to a slight but sufficient spatial retinal disparity in the retinal images of the 2D image detected by the viewer's visual system. The viewer is thus caused to experience a single fused cyclopean image, a single vision resulting from a fusion of the retinally disparate images, in which the viewer's perception of depth in any monocular depth cue in the 2D image may have is so enhanced as to be experienced as a form of stereo vision, and in which the viewer's perception of clarity is so enhanced as to be experienced as an increase in resolution of the 2D image.

While the invention has been disclosed in connection with the example of certain embodiments, it will be understood that there is no intention to limit the invention to the particular embodiments shown. This disclosure is intended to cover the general application of the method and systems specifically disclosed and the various alternative and equivalent constructions included within the spirit and scope of the appended claims.

What I claim as my invention is:

1. A system and device within the system for enhancement of visual perception in a viewer of a two-dimensional image comprising:
   a) a two-dimensional image displayed on an image surface; and
   b) at least one enhancer which generates at least one virtual visually identifiable object positioned in front of the image surface to create an enhanced scene with the two-dimensional image within the binocular field of view of the viewer, so that binocular images of the enhanced scene are formed in the viewer; wherein:
      1) the ratio of the distance of said at least one virtual visually identifiable object from and in front of the image surface, to the horizontal width of the two-dimensional image is within a range having a minimum value of about 0.05 and a maximum value of about 0.5;
      2) the ratio of the horizontal width of said at least one virtual visually identifiable object, to the horizontal width of the two-dimensional image is within a range having a minimum value of about 0.01 and a maximum value of about 0.05; and
      3) the ratio of the distance of said at least one virtual visually identifiable object from and in front of the image surface, to the average distance from the viewer to the points of fixation of the viewer on the image surface is within a range having a minimum value of about 0.02 and a maximum value of about 0.2;
   having the effect of enhancement of the viewer's visual perception in viewing the two-dimensional image by and/or with the fusion of said binocular images of the enhanced scene in the viewer.

2. The system and device within the system for enhancement of visual perception of claim 1 wherein said at least one enhancer is a lenticular device, or a holographic device, or a concave mirror projection device.

3. The system for enhancement of visual perception of claim 1 wherein:
   1) the ratio of the distance of said at least one virtual visually identifiable object from and in front of the image surface, to the horizontal width of the two-dimensional image is within a range having a minimum value of about 0.07 and a maximum value of about 0.3;

2) the ratio of the horizontal width of said at least one virtual visually identifiable object, to the horizontal width of the two-dimensional image is within a range having a minimum value of about 0.01 and a maximum value of about 0.035; and 3) the ratio of the distance of said at least one virtual visually identifiable object from and in front of the image surface, to the average distance from the viewer to the points of fixation of the viewer on the image surface is within a range having a minimum value of about 0.03 and a maximum value of about 0.12.

4. The system for enhancement of visual perception of claim 1 wherein:

1) the ratio of the distance of said at least one virtual visually identifiable object from and in front of the image surface, to the horizontal width of the two-dimensional image is within a range having a minimum value of about 0.1 and a maximum value of about 0.2;

2) the ratio of the horizontal width of said at least one virtual visually identifiable object, to the horizontal width of the two-dimensional image is within a range having a minimum value of about 0.01 and a maximum value of about 0.03; and 3) the ratio of the distance of said at least one virtual visually identifiable object from and in front of the image surface, to the average distance from the viewer to the points of fixation of the viewer on the image surface is within a range having a minimum value of about 0.04 and a maximum value of about 0.1.

5. The system for enhancement of visual perception of claim 1 wherein:

1) the ratio of the distance of said at least one virtual visually identifiable object from and in front of the image surface, to the horizontal width of the two-dimensional image is within a range having a minimum value of about 0.12 and a maximum value of about 0.16;

2) the ratio of the horizontal width of said at least one virtual visually identifiable object, to the horizontal width of the two-dimensional image is within a range having a minimum value of about 0.012 and a maximum value of about 0.025; and 3) the ratio of the distance of said at least one virtual visually identifiable object from and in front of the image surface, to the average distance from the viewer to the points of fixation of the viewer on the image surface is within a range having a minimum value of about 0.045 and a maximum value of about 0.07.

6. The system for enhancement of visual perception of claim 1 wherein said at least one virtual visually identifiable object has one or more of the following group of characteristics: 1) physically separated in space from the two-dimensional image; 2) physically separated in space from the image surface; 3) visually locatable by the viewer to be separate in space from the two-dimensional image; 4) visually locatable by the viewer to be separate in space from the image surface; 5) delineated from the two-dimensional image; 6) distinguishable from the two-dimensional image; 7) with boundaries that are distinguishable from the content of the two-dimensional image behind it; 8) not masked by the content of the two-dimensional image behind it; and 9) as visually prominent to the viewer as the two-dimensional image.

7. The system and device within the system for enhancement of visual perception of claim 1 wherein said at least one virtual visually identifiable object is luminous to the viewer.

8. The system and device within the system for enhancement of visual perception of claim 7 wherein the luminosity of said at least one virtual visually identifiable object is variable in intensity, color and/or polarization, such variability being controlled with reference to the brightness, color, and/or monocular depth cues of the two-dimensional image, or otherwise programably controlled to intensify the enhancement effect and/or accommodate the viewer.

9. A system and device within the system for enhancement of visual perception in a viewer of a two-dimensional image comprising:

a) a two-dimensional image displayed on an image surface; and b) at least one enhancer which generates at least one virtual visually identifiable object positioned in front of the image surface to create an enhanced scene with the two-dimensional image within the binocular field of view of the viewer, so that binocular images of the enhanced scene are formed in the viewer; wherein:

1) the ratio of the distance of said at least one virtual visually identifiable object from and in front of the image surface, to the horizontal width of the two-dimensional image is within a range having a minimum value of about 0.12 and a maximum value of about 0.16;

2) the ratio of the horizontal width of said at least one virtual visually identifiable object, to the horizontal width of the two-dimensional image is within a range having a minimum value of about 0.012 and a maximum value of about 0.025; and 3) the ratio of the distance of said at least one virtual visually identifiable object from and in front of the image surface, to the average distance from the viewer to the points of fixation of the viewer on the image surface is within a range having a minimum value of about 0.045 and a maximum value of about 0.07;

having the effect of enhancement of the viewer's visual perception in viewing the two-dimensional image by and/or with the fusion of said binocular images of the combined scene in the viewer.

10. The system and device within the system for enhancement of visual perception of claim 9 wherein said at least one enhancer is a lenticular device, or a holographic device, or a concave mirror projection device.

11. The system for enhancement of visual perception of claim 9 wherein said at least one virtual visually identifiable object is luminous to the viewer.

12. The system for enhancement of visual perception of claim 11 wherein the luminosity of said at least one virtual visually identifiable object is variable in intensity, color and/or polarization, such variability being controlled with reference to the brightness, color, and/or monocular depth cues of the two-dimensional image, or otherwise programably controlled to intensify the enhancement effect and/or accommodate the viewer.

13. A system for enhancement of visual perception in a viewer of a two-dimensional image comprising:

a) a two-dimensional image displayed on an image surface; and b) at least one enhancer which generates at least one virtual visually identifiable object positioned in front of the image surface to create an enhanced scene with the two-dimensional image within the binocular field of view of the viewer, so that binocular images of the enhanced scene are formed in the viewer;

having the effect of enhancement of the viewer's visual perception in viewing the two-dimensional image by and/or with the fusion of said binocular images of the enhanced scene in the viewer.

14. The system for enhancement of visual perception of claim 13 wherein said at least one enhancer is a lenticular device, or a holographic device, or a concave mirror projection device.

15. The system for enhancement of visual perception of claim 14 wherein:
1) the ratio of the distance of said at least one virtual visually identifiable object from and in front of the image surface, to the horizontal width of the two-dimensional image is within a range having a minimum value of about 0.05 and a maximum value of about 0.5;
2) the ratio of the horizontal width of said at least one virtual visually identifiable object, to the horizontal width of the two-dimensional image is within a range having a minimum value of about 0.01 and a maximum value of about 0.05; and
3) the ratio of the distance of said at least one virtual visually identifiable object from and in front of the image surface, to the average distance from the viewer to the points of fixation of the viewer on the image surface is within a range having a minimum value of about 0.02 and a maximum value of about 0.2.

16. The system for enhancement of visual perception of claim 13 wherein said binocular images of the enhanced scene are formed in the viewer with a slight but sufficient retinal disparity on Panum's fusional areas of the viewer's eyes.

17. The system for enhancement of visual perception of claim 13 wherein the positioning of said at least one virtual visually identifiable object is within Panum's fusional region for the viewer's view of the two-dimensional image.

18. The system for enhancement of visual perception of claim 13 wherein the positioning of said at least one virtual visually identifiable object is substantially within the depth of field of focus of the viewer's eyes when the two-dimensional image is substantially in focus for the viewer.

19. The system for enhancement of visual perception of claim 13 wherein:
1) the ratio of the distance of said at least one virtual visually identifiable object from and in front of the image surface, to the horizontal width of the two-dimensional image is within a range having a minimum value of about 0.12 and a maximum value of about 0.16;
2) the ratio of the horizontal width of said at least one virtual visually identifiable object, to the horizontal width of the two-dimensional image is within a range having a minimum value of about 0.012 and a maximum value of about 0.025; and
3) the ratio of the distance of said at least one virtual visually identifiable object from and in front of the image surface, to the average distance from the viewer to the points of fixation of the viewer on the image surface is within a range having a minimum value of about 0.045 and a maximum value of about 0.07.

20. A method for enhancement of visual perception in a viewer of a two-dimensional image comprising: the creation of an enhanced scene for the viewer which includes the two-dimensional image and an enhancer which generates at least one virtual visually identifiable object positioned in front of the image surface within the binocular field of view of the viewer, so that binocular images of the enhanced scene are formed in the viewer, wherein:
1) the ratio of the distance of said at least one virtual visually identifiable object from and in front of the image surface, to the horizontal width of the two-dimensional image is within a range having a minimum value of about 0.05 and a maximum value of about 0.5;
2) the ratio of the horizontal width of said at least one virtual visually identifiable object, to the horizontal width of the two-dimensional image is within a range having a minimum value of about 0.01 and a maximum value of about 0.05; and
3) the ratio of the distance of said at least one virtual visually identifiable object from and in front of the image surface, to the average distance from the viewer to the points of fixation of the viewer on the image surface is within a range having a minimum value of about 0.02 and a maximum value of about 0.2.

* * * * *